United States Patent
Iden et al.

(10) Patent No.: US 9,546,752 B2
(45) Date of Patent: Jan. 17, 2017

(54) DEVICE FOR DETECTING AND ISOLATING FUEL LEAKS IN A VEHICLE

(71) Applicant: UNION PACIFIC RAILROAD COMPANY, Omaha, NE (US)

(72) Inventors: Michael E. Iden, Kildeer, IL (US); Thomas A. Kennedy, Omaha, NE (US)

(73) Assignee: UNION PACIFIC RAILROAD COMPANY, Omaha, NE (US)

( * ) Notice: Subject to any disclaimer, the term of this patent is extended or adjusted under 35 U.S.C. 154(b) by 0 days.

(21) Appl. No.: 14/686,089

(22) Filed: Apr. 14, 2015

(65) Prior Publication Data

US 2016/0305595 A1    Oct. 20, 2016

(51) Int. Cl.
*F16L 55/168*    (2006.01)
*F16L 55/00*     (2006.01)

(52) U.S. Cl.
CPC ........... *F16L 55/00* (2013.01); *F16L 55/168* (2013.01); *Y10T 137/5762* (2015.04)

(58) Field of Classification Search
CPC .......... F16L 55/00; F16L 55/16; F16L 55/168; Y10T 137/5762

USPC ........................................... 137/312
See application file for complete search history.

(56) References Cited

U.S. PATENT DOCUMENTS

| 4,481,931 | A  | * | 11/1984 | Bruner | ............... | F02M 37/0017 |
|           |    |   |         |        |                | 123/514      |
| 6,164,345 | A  | * | 12/2000 | Haddox | ............... | F16L 55/168  |
|           |    |   |         |        |                | 137/312      |
| 7,357,144 | B2 | * | 4/2008  | Im et al. | ............ | G01M 3/223   |
|           |    |   |         |        |                | 137/15.04    |

\* cited by examiner

*Primary Examiner* — Kevin Lee
(74) *Attorney, Agent, or Firm* — Pillsbury Winthrop Shaw Pittman, LLP

(57) ABSTRACT

A device for detecting fuel leaks in a vehicle is provided. The device includes a body configured to be mounted in sealing engagement around a portion of a fuel line in the vehicle; and a collection chamber configured to collect fuel that leaks from the fuel line within the body. The body is configured to direct the fuel leaked from the fuel line to the collection chamber. At least a portion of the body or collection chamber is transparent to enable presence of the fuel leaked from the fuel line to be visually verified. The collection chamber is operatively connected to a drain connector.

24 Claims, 2 Drawing Sheets

DEVICE FOR DETECTING AND ISOLATING FUEL LEAKS IN A VEHICLE

BACKGROUND

A diesel engine powered locomotive includes an internal combustion engine that powers individual electric motors (referred to as traction motors) that drive track engaging wheels of the locomotive. The internal combustion engine combusts fuel to generate power that is used to operate the locomotive.

The fuel is provided to the internal combustion engine by a fuel system that includes a number of fuel lines. The fuel lines of the fuel system may be connected in a fluid communication with each other using clamps. However, fuel leaks may develop at locations where the fuel lines connect with the clamps. Fuel leaks may develop, for example, near the clamps of the low-pressure fuel hoses or lines of the fuel system.

Such fuel leaks in the presence of an ignition source (such as engine temperatures) may cause locomotive fire as well as way side damage.

BRIEF SUMMARY

In one embodiment of the present disclosure, a device for detecting and isolating fuel leaks in a vehicle is provided. The device includes a body configured to be mounted in sealing engagement around a portion of a fuel line in the vehicle, and a collection chamber configured to collect fuel that leaks from the fuel line within the body. The body is configured to direct the fuel leaked from the fuel line to the collection chamber. At least a portion of the body or collection chamber is transparent to enable presence of the fuel leaked from the fuel line to be visually verified. The collection chamber is operatively connected to a drain connector Other aspects, features, and advantages of the present disclosure will become apparent from the following detailed description, the accompanying drawings, and the appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION OF THE DRAWINGS

The present disclosure provides a device for detecting fuel leaks in a vehicle. It should be appreciated that although this device is discussed herein with regards to detecting fuel leaks in a locomotive and/or a locomotive engine, this device may be applied to any other type of engine and/or vehicle. It is contemplated that such engines may include, but not be limited to, automotive engines (e.g., trucks), marine engines, non-road vehicle (e.g., construction, agricultural, ground support) engines and aircraft engines.

The diesel engine powered locomotive includes a fuel system that may be configured to deliver fuel to the engine 26. The fuel system includes a fuel tank, a low pressure fuel subsystem and a high pressure fuel subsystem.

The fuel tank may be configured to store and carry/transport fuel. The fuel tank may include a volume capacity to carry/transport fuel that may be enough for reasonable length train trips. The fuel tank may be configured to supply fuel, via the low pressure fuel subsystem and the high pressure fuel subsystem, to the engine 26. The unburned excess fuel not used for engine combustion and/or the unused fuel may be configured to return to the fuel tank via a drain line.

The low pressure fuel subsystem includes pump(s), filter(s), pre-heater(s) and fuel lines that are configured to deliver the fuel from the fuel tank to the high pressure fuel subsystem. The high pressure fuel subsystem includes pump(s), filter(s), pre-heater(s) and fuel lines that are configured to pressurize the fuel and deliver the fuel to a fuel injector and to the cylinder of the engine 26, where the fuel may be burned or combusted to provide power to the locomotive.

Figure 1:
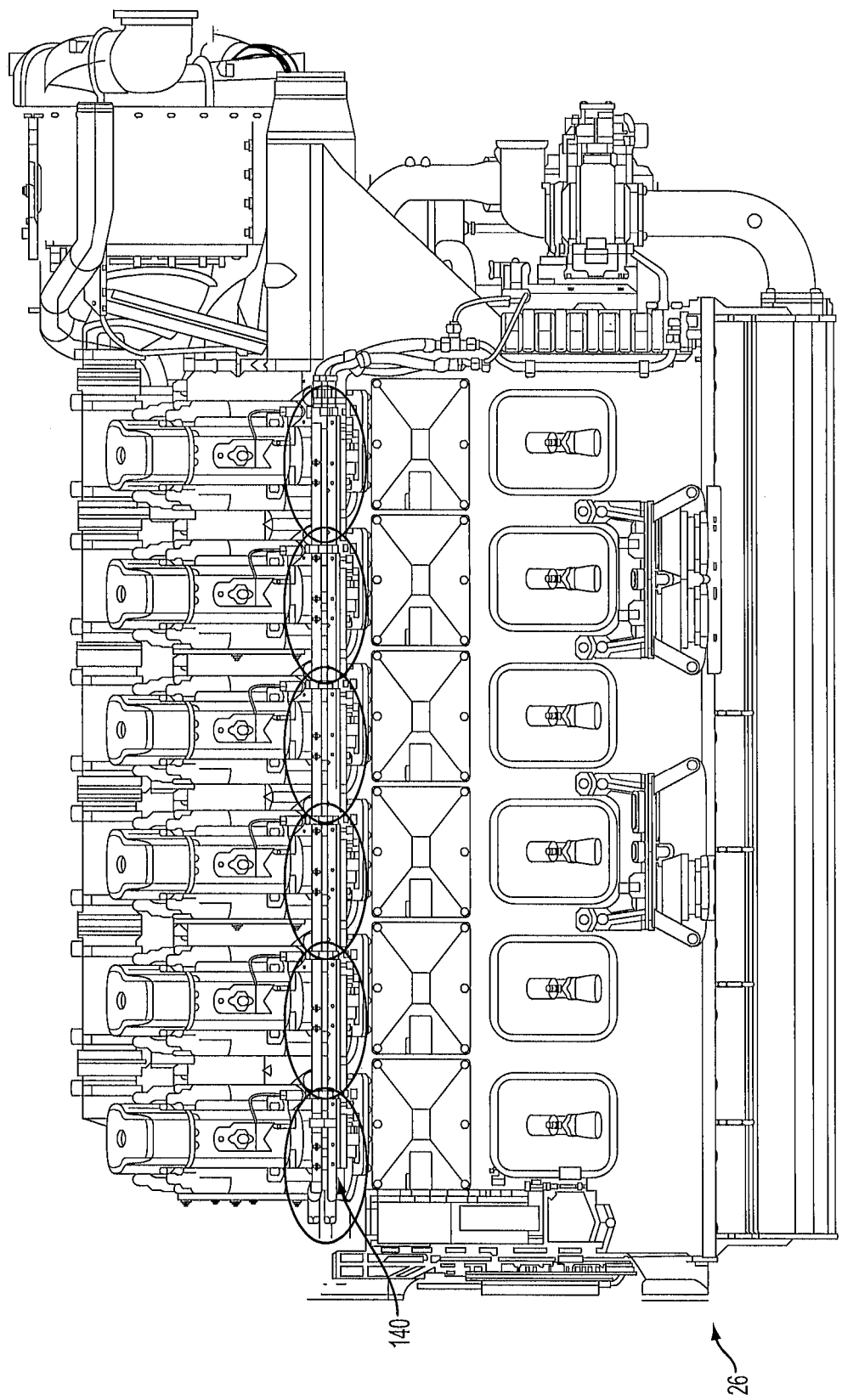
FIG. 1 shows an engine of the locomotive in accordance with an embodiment of the present disclosure.

FIG. 1 shows the engine 26 of the locomotive along with the low pressure fuel lines 140.

Figure 2:
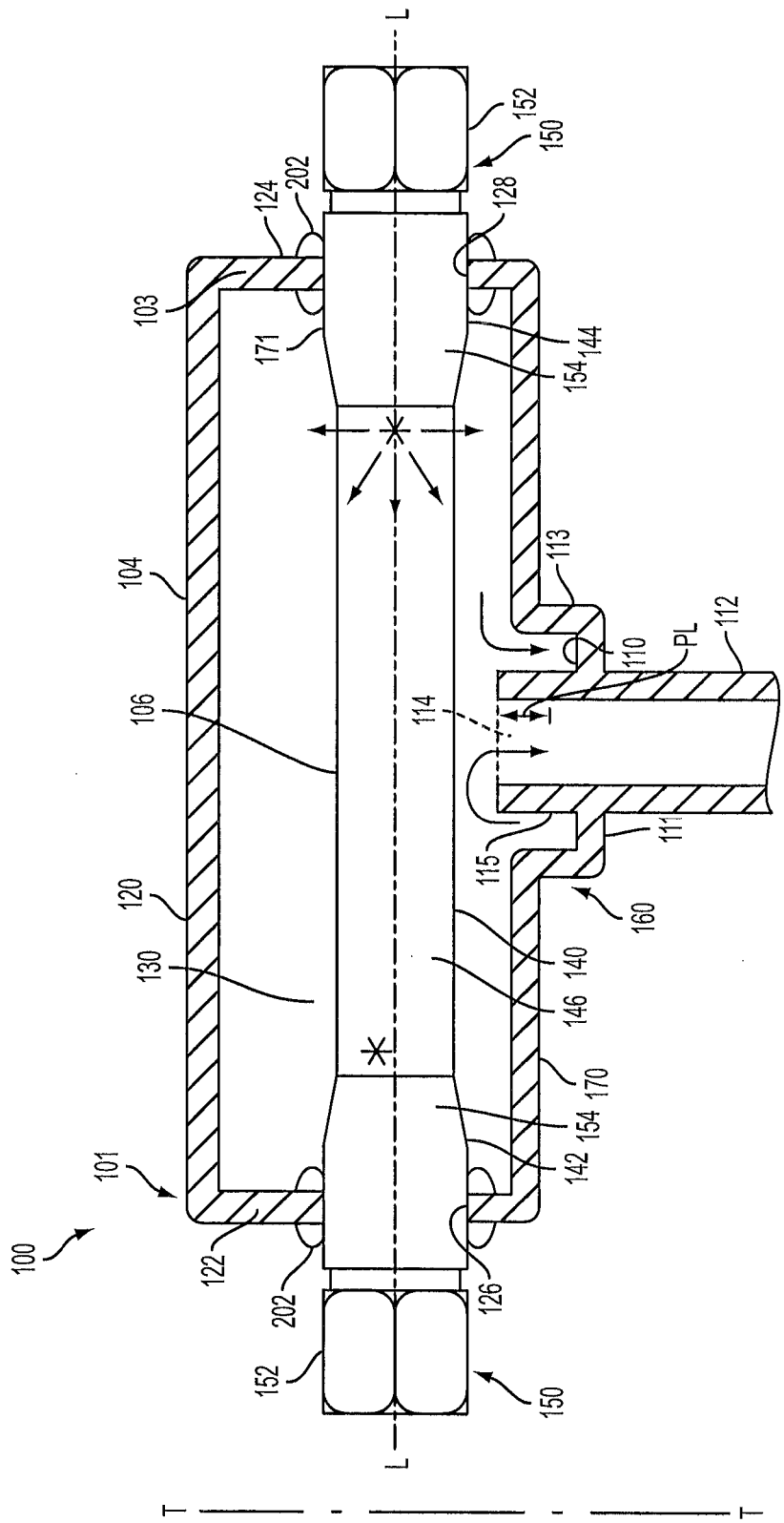
FIG. 2 shows a device for detecting and isolating fuel leaks in the locomotive in accordance with an embodiment of the present disclosure.

FIG. 2 shows a device 100 for detecting and isolating fuel leaks in low pressure fuel lines 140 of the locomotive. For example, in one embodiment, the device 100 is configured to prevent leaked fuel from reaching high-temperature points such as exhaust pipes. The device 100 may be configured for collecting fuel resulting from fuel leaks. The device 100 includes a body 104, a collection chamber 110, a drain connector 112, and two gasket members or seal members 202. Any fuel exiting/leaking the fuel line 140 flows inside the body 104 and collects in the collection chamber 110 before overflowing and draining downward through the integrally formed drain connector 112.

The body 104 has a cylindrical or other enclosed shape. Likewise, the collection chamber 110 has an annular shape, or other configuration suitable for collecting fuel.

The body 104, the collection chamber 110 and the drain connector 112 are integrally molded or integrally formed together. In one embodiment of the present disclosure, the drain connector 112 may be optional. In such an embodiment, the body 104 and the collection chamber 110 are integrally molded or formed together.

The body 104, the collection chamber 110 and the drain connector 112 may be made from a plastic material or a polymer material. The body 104, the collection chamber 110 and the drain connector 112 may be made from a heat-resistant material, a fuel-resistant (or corrosion-resistant) material or a material that is resistant to fuel, corrosion and heat. The body 104, the collection chamber 110 and the drain connector 112 may be made from a diesel fuel resistant plastic, elastomeric or polymeric material.

The body 104, the collection chamber 110 and the drain connector 112 may be integrally molded or formed using, for example, an injection molding process to produce a low-cost, single-piece device 100. The body 104, the collection chamber 110 and the drain connector 112 may also be integrally molded or formed using casting process, vulcanization process, or thermo setting process.

The body 104 may be configured to be mounted in sealing engagement around a portion 106 of the fuel line 140 in the locomotive. The portion 106 of the fuel line 140 may include compression fittings or clamps 150 disposed on opposing ends of the fuel line 140, In one embodiment, the clamps 150 may be ferrule clamps.

The fuel line 140 of the locomotive has first and second end portions 142 and 144 and a fuel passageway 146 extending between the first and second end portions 142 and 144 for transmission of fuel.

Each of the first and second end portions 142 and 144 may include a compression fitting or ferrule clamp 150 to connect the fuel line 140 with other fuel lines and/or other receiving/line fittings, such as fuel valves. For example, the compression fitting 150 may include an outer compression nut 152 and an inner compression ring or ferrule 154. The inner compression ring or ferrule 154 has a cylindrical shaped configuration with an opening to receive the fluid line 140. The outer compression nut 152 includes an internally threaded end portion, has a cylindrical shaped configuration with an opening to receive the fluid line 140, and has a hexagonal shaped exterior surface for manipulation of the compression nut 152. An end portion of the receiving fitting includes an externally threaded end portion. This end portion of the receiving fitting may be also constructed and sized to allow the insertion of the fuel line 140.

The inner compression ring (or ferrule) 154 may be received in the space formed between the fuel line 140 and the receiving fitting when an end portion of the fuel line 140 is received by the end portion of the receiving fitting. The outer compression nut 152 may be slid along the fuel line 140 so that its internally threaded end portion engages the externally threaded end portion of the receiving fitting. When the outer compression nut 152 is tightened, the outer compression nut 152 may be configured to apply a force on the ferrule 154 disposed between the receiving fitting and the fuel line 140 so that the inner compression ring or ferrule 154 seals the space between the fuel line 140, the outer compression nut 152, and the receiving fitting, thereby forming a fluid tight joint/seal. That is, a portion of the ferrule may be compressed about the fuel line 140 so as to retain fuel line 140 in place as a result of the force exerted on the inner compression ring or ferrule 154 by the outer compression nut 152. The body 104 may also be configured to be mounted in a sealing engagement around a portion of the fuel line 140 in the vehicle using a wire clamp, a band clamp, or other compression mechanisms as would be appreciated by one skilled in the art.

The body 104 may be a hollow cylindrical body portion 120 and may include opposing end portions 122 and 124. The body 104 may include any shape and configuration. For example, the body 104 may include an elliptical shaped configuration, or a rectangular shaped configuration, or a polygonal shaped configuration. The body 104 may be elongated in a longitudinal axis L-L. The end portions 122 and 124 extend along a transverse axis T-T inwardly from the body portion 120. The end portions 122 and 124 have openings 126 and 128. Each of the openings 126 and 128 may be sized and constructed to receive the fuel line 140 and/or its clamps 150 therein. The diameter of the body portion 120 may be larger than the diameter of each of the openings 126 and 128 so that, when the fuel line 140 is concentrically disposed within the body 104, an annular space 130 may be formed between the fuel line 140 and the body portion 120.

The body 104 may be configured to direct the fuel leaked from the fuel line 140 to the collection chamber 110. The fuel leakage may be contained inside the body 104 and may be guided in a controlled stream downward to the collection chamber 110. The fuel leaking/spraying from the fuel line 140 into the annular space 130 may be guided towards the collection chamber 110 due to the force of gravity and by the construction and arrangement of the body 104.

For example, a bottom/lower wall 170 of the body 104 may be sloped or otherwise constructed to direct the fuel leaked/exited from the fuel line 140 to the collection chamber 110. The bottom/lower wall 170 of the body 104 may be slightly sloped towards a central portion 160 thereof at which the collection chamber 110 may be disposed.

The collection chamber 110 may be configured to collect fuel that leaks from the fuel line 140 within the body 104. The collection chamber 110 may also be referred to as an indicator cup that has a cup like shape/design. The collection chamber 110 may be disposed on the central portion 160 of the bottom wall 170. The collection chamber 110 may be constructed to include a ring shaped body having bottom wall 111, and side walls 113 and 115. The side walls 113 and 115 form collection cavity therebetween. The side walls 115 also form the upper, side portion of the drain connector 112. The collection chamber 110 collects small amount of (red-dyed) locomotive diesel fuel that may be an easily-seen indicator that a fuel leak has occurred.

The drain connector 112 may be operatively connected to the collection chamber 110 and configured to drain excess of the collected fuel from the collection chamber 110 to a reservoir (not shown) when the collected fuel in the collection chamber 110 exceeds a predetermined amount.

The drain connector 112 may be disposed centrally of the collection chamber 110. An inlet 114 of the drain connector 112 may be positioned at the same level as a lowest point on the bottom wall 170 of the body 104. The drain connector 112 extends vertically downward from the body 104. The drain connector 112 may be a cylindrical tube member with openings at both ends. One end forms the inlet 114 and the other end opening connects to the reservoir. The downward facing drain connector 112 may direct leaking fuel down into a locomotive under pressure sump where it may be collected by organic waste retention tank.

The drain connector 112 may be disposed on the bottom (central) wall of the collection chamber and the drain connector 112 may be operatively coupled to a mechanically operated drain valve that may be configured to drain excess of the collected fuel from the collection chamber to the reservoir when the collected fuel in the collection chamber exceeds a predetermined amount.

The device 100 may optionally include a sensor that may be configured to detect the amount/volume of the fuel leakage in the collection chamber 110 and/or detect the fuel level of the fuel leakage in the collection chamber 110 and send this information to the control system. The control system, based on the received signal from the sensor, may be configured to operate a drain valve to drain excess of the collected fuel from the collection chamber to the reservoir when the volume/amount or the fuel level of the collected fuel in the collection chamber 100 exceeds a predetermined volume threshold or a predetermine fuel level threshold.

The gasket members 202 are configured to provide a sealing engagement between the body 104 and the fuel line 140 and/or its clamps 150. The gasket members 202 form a fluid tight seal between the body 104 and the fuel line 140 and/or its clamps 150 to contain the fuel leaked from the fuel line 140 within the body 104. The gasket members 202 are positioned on end portions 101 and 103 of the device 100. The gasket members 202 are annular and each of the gasket members 202 includes a radial outer surface engaging the body 104 and a radial inner surface engaging the fuel line 140 and/or its clamps 150. The gasket members 202 are compressed radially between the body 104 and the fuel line 140 and/or its clamps 150 to sealingly engage the body 104 and the fuel line 140 and/or its ferrule clamp 150.

The fuel in the present disclosure may include diesel fuel. The diesel fuel used for off-road use (e.g., locomotives) is required to contain a red dye so that it can be easily identified for taxation purposes. The locomotive diesel fuel accumulated/collected in the collection chamber 110 may be easily seen/detected by a mechanic or locomotive engineer because of its red colored dye. However, the device 100 of the present disclosure may be used with other fuels such as high sulfur diesel fuel (with blue colored dye). The device 100 of the present disclosure may also be used with bio-diesel fuel, other synthetic non-fossil fuels, and/or other fuels. These fuels may include additives such as dyes, cleaners, or the like that are both easily combusted by the locomotive engines and that enable easy visual identification of the fuel leak.

At least a portion of the body 104, the collection chamber 110 and/or the drain connector 112 may be translucent or transparent to enable presence of the fuel leaked from the fuel line 140 to be visually verified.

In one embodiment, the entire body 104 including the collection chamber 110 may be made from a transparent or translucent material to enable visual verification of the fuel leak. In another embodiment, only the collection chamber 110 may be formed from a transparent or translucent material to enable visual verification of the fuel leak.

The body 104 may include transparent or translucent viewing window(s) through which the collection chamber 110 may be viewed to detect the indication of the fuel leak. The transparent or translucent viewing window(s) may be disposed on side walls or top walls of the body 104 to enable visual determination of the fuel collected in the collection chamber 110. The transparent or translucent viewing window(s) on side walls of the body 104 may disposed towards in a lower portion of the body 104 (i.e., next to the collection chamber 110) to visually determine that a volume/an amount of fuel is collected in the collection chamber 110.

During regular service or inspection of the locomotive, technicians or service personnel visually inspect whether fuel is collected in the collection chamber 110. If fuel is detected in the collection chamber 110, then the fuel leak in the locomotive is determined, and appropriate corrective maintenance may be scheduled. If there is no accumulation of the fuel in the collection chamber 110, it indicates that the fuel line has a good, leak-proof sealing condition, Also, by determining the amount/volume of the leakage fuel collected in the collection chamber 110 between consecutive inspection or service periods, the size and/or severity of the leak may be determined. Based on the determined size and/or severity of the leak, the technicians or service personnel may determine (if or) when the appropriate corrective maintenance needs to be scheduled.

The device 100 of the present disclosure may be configured to be retrofit on the existing or older low pressure fuel lines of the locomotive. For example, the device 100 may be retrofitted during regular service or maintenance of the locomotive. The installation of the device 100 on the low pressure fuel line does not require any modifications to the existing fuel system. Alternatively, the device 100 may be attached or connected to newer low pressure fuel lines of the locomotive during their manufacturing process.

A method for installing the device 100 on the low pressure fuel line 140 of the locomotive includes a procedure at which the device 100 may be installed on the low pressure fuel line 140 and a procedure at which the low pressure fuel line 140 with the device 100 installed thereon may be connected to other fuel lines or receiving/line fittings of the fuel system.

At the first installation procedure, the device 100 may be slipped over the low pressure fuel line 140. The device 100 may be slipped over the low pressure fuel line before the low pressure fuel line is installed on the diesel engine 26 or in the fuel system. The device 100 may be positioned on the low pressure fuel line such that the body 104 of the device 100 encloses or surrounds the fuel line and the clamps positioned at the fuel line ends, and the drain connector 112 of the device 100 projects vertically downward.

The gasket members 202 installed between the body 104 and the clamps 150 provide a fluid tight seal between the body 104 and the fuel line 140. For example, the radial inner surfaces of the gasket members 202 are configured to engage with an outer surface 171 of the clamps 150 and the radial outer surfaces of the gasket or seal members 202 are configured to engage with inner surfaces of the opposing end portions 122 and 124 of the body 104 to form a seal. For example, a radial fluid tight seal may be made between the body 104 and the clamps 150.

At the second installation procedure, the low-pressure fuel line 140 with the device 100 installed thereon may be connected to threaded (pipe) nipples on the fuel "tee" fitting or banjo fitting. For example, the low-pressure fuel line 140 with the device 100 installed thereon may be connected to the threaded pipe nipples on the fuel fitting by tightening nuts 152. The banjo fitting or an internally relieved bolt may include a perforated hollow bolt member and spherical union for fluid transfer.

Once installed, the device 100 may be configured to operate as follows. As the fuel leaks from the fuel line and the clamps, the fuel leakage may be captured and directed by the side or top walls of the body 104 towards the bottom wall 170 of the body 104. A portion of the fuel leakage may simply fall/flow to the bottom wall 170 by the force of gravity. The bottom wall 170 of the body 104 may be configured to direct the fuel leakage towards the collection chamber 110 disposed on the central portion 160 of the bottom wall 170.

The fuel leakage starts to accumulate in the cavity of the collection chamber 110. When the cavity of the collection chamber 110 is completely filled with the fuel leakage, the excess fuel leakage spills over the top edge of the collection chamber 110 and flows into the drain connector 112. As long as the level of the fuel in the collection chamber 110 remains below the predetermined level PL, the fuel remains in the collection chamber 110. If the level of fuel in the collection chamber 110 raises above the predetermined level PL, the excess fuel drains into the reservoir through the drain connector 112. That is, when the fuel in the collection chamber 110 raises to the predetermined level PL, it may be sufficient to enter the inlet 114 of the drain connector 112. The drain connector 112 may act as a predetermined level drain to maintain predetermined level PL of the fuel in the collection chamber 110. The drain connector 112 may direct the excess fuel leakage to the locomotive under pressure sump where it may be collected by organic waste retention tank.

Thus, the present disclosure provides a locomotive fuel hose leak indicator/detector and shield that serves as a "Tell Tale" that a fuel leak is present and may prevent a fuel spray which may be easily ignited. The body 104 or hose-like "shield" may be constructed and arranged to surround the low-pressure fuel line 140 to reduce the risk of fuel spray and to act as a collector for the leaking fuel. The device 100 of the present disclosure may be configured to reduce risk of fuel fires on the locomotives and mitigate causality costs, etc.

The foregoing illustrated embodiments have been provided to illustrate the structural and functional principles of the present disclosure and are not intended to be limiting. To the contrary, the present disclosure is intended to encompass all modifications, alterations and substitutions within the spirit and scope of the appended claims.

What is claimed is:

1. A device for detecting and isolating fuel leaks comprising:
   a body configured to be mounted in a sealing engagement around a portion of a fuel line in a vehicle;
   a collection chamber configured to collect fuel that leaks from the fuel line within the body; and
   a drain connector operatively connected to the collection chamber,
   wherein at least a portion of the body, collection chamber, and/or drain connector is transparent.

2. The device of claim 1, wherein the body, the collection chamber and the drain connector are integrally molded.

3. The device of claim 1, wherein the body, the collection chamber and the drain connector are made from a plastic material, or a polymer material.

4. The device of claim 3, wherein the body, the collection chamber and the drain connector are made from a heat and fuel resistant material.

5. The device of claim 1, wherein the vehicle comprises a locomotive.

6. The device of claim 1, wherein at least the portion of the body includes a transparent viewing window to enable visual detection of fuel leakage from the fuel line.

7. The device of claim 1, further comprising seal members configured to sealingly engage the body and the fuel line of the vehicle to form a seal therebetween so as to contain the fuel leaked from the fuel line within the body.

8. The device of claim 1, wherein the drain connector is configured to drain excess of the collected fuel from the collection chamber to a reservoir when the collected fuel in the collection chamber exceeds a predetermined amount.

9. The device of claim 1, wherein the vehicle is a diesel engine powered vehicle.

10. A device for detecting and isolating fuel leaks comprising:
    a body mounted in a sealing engagement around a fuel line in a vehicle;
    a collection chamber used to collect fuel that leaks from the fuel line within the body; and
    a drain connector for draining excess fuel collected in the collection chamber,
    wherein the device comprises a transparent material.

11. The device of claim 10, wherein the body, the collection chamber and the drain connector are integrally molded using a plastic or a polymeric material.

12. The device of claim 11, wherein the body, the collection chamber and the drain connector are made from a heat-resistant material.

13. The device of claim 12, wherein the body, the collection chamber and the drain connector are made from a fuel-resistant material.

14. The device of claim 10, wherein the device includes a transparent viewing window to determine the presence of fuel leaks from the fuel line.

15. The device of claim 10, further comprising seal members configured to sealingly engage the body and the fuel line of the vehicle to form a seal therebetween so as to contain the fuel leaked from the fuel line within the body.

16. The device of claim 10, wherein the drain connector is configured to drain excess of the collected fuel from the collection chamber to a reservoir when the collected fuel in the collection chamber exceeds a predetermined amount.

17. The device of claim 10, wherein the vehicle is a diesel engine powered vehicle.

18. The device of claim 10, wherein the vehicle comprises a locomotive.

19. A locomotive comprising:
    a device for detecting and isolating fuel leaks in the locomotive, the device comprising:
      a body mounted in a sealing engagement around an entire fuel line in the locomotive;
      a collection chamber constructed and arranged to collect fuel that leaks from the fuel line within the body; and
      a drain connector for draining excess fuel collected in the collection chamber,
      wherein at least a portion of the body, collection chamber, and/or drain connector comprises a transparent material.

20. The locomotive of claim 19, wherein the device further comprises seal members constructed and arranged to sealingly engage the body and the fuel line of the locomotive to form a seal therebetween so as to contain the fuel leaked from the fuel line within the body.

21. A vehicle comprising:
    a device for detecting and isolating fuel leaks in the vehicle, the device comprising:
      a body mounted in a sealing engagement around an entire fuel line in the vehicle;
      a collection chamber constructed and arranged to collect fuel that leaks from the fuel line within the body; and
      a drain connector for draining excess fuel collected in the collection chamber,
      wherein at least a portion of the body, collection chamber, and/or drain connector comprises a transparent material.

22. The vehicle of claim 21, wherein the device further comprises seal members constructed and arranged to sealingly engage the body and the fuel line of the vehicle to form a seal therebetween so as to contain the fuel leaked from the fuel line within the body.

23. An engine comprising:
    a device for detecting and isolating fuel leaks in the engine, the device comprising:
      a body mounted in a sealing engagement around an entire fuel line in the engine;
      a collection chamber constructed and arranged to collect fuel that leaks from the fuel line within the body; and
      a drain connector for draining excess fuel collected in the collection chamber,
      wherein at least a portion of the body, collection chamber, and/or drain connector comprises a transparent material.

24. The engine of claim 23, wherein the device further comprises seal members constructed and arranged to sealingly engage the body and the fuel line of the engine to form a seal therebetween so as to contain the fuel leaked from the fuel line within the body.

* * * * *